United States Patent
Aso et al.

(10) Patent No.: US 6,459,525 B1
(45) Date of Patent: Oct. 1, 2002

(54) OPTICAL FIBER TYPE WIDE BANDWIDTH WAVELENGTH CONVERTER AND WAVELENGTH CONVERTING OPTICAL FIBER USED THEREFOR

(75) Inventors: Osamu Aso; Shu Namiki, both of Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 195 days.

(21) Appl. No.: 09/656,755

(22) Filed: Sep. 7, 2000

(30) Foreign Application Priority Data

Sep. 7, 1999 (JP) ............................................. 11-253499

(51) Int. Cl.[7] ................................................. G02F 1/35
(52) U.S. Cl. ......................... 359/332; 359/330; 359/326
(58) Field of Search .................................. 359/332, 327, 359/330, 326, 328, 329, 331

(56) References Cited

U.S. PATENT DOCUMENTS

| | | | |
|---|---|---|---|
| 5,386,314 A | * | 1/1995 | Jopson ........................ 359/326 |
| 5,532,868 A | * | 7/1996 | Gnauck et al. ............. 359/332 |
| 5,754,334 A | * | 5/1998 | Artiglia et al. ............. 359/326 |
| 6,330,104 B1 | * | 12/2001 | Kim et al. ................... 359/327 |

* cited by examiner

*Primary Examiner*—Frank G. Font
*Assistant Examiner*—Roy M. Punnoose
(74) *Attorney, Agent, or Firm*—Oblon, Spivak, McClelland, Maier & Neustadt, P.C.

(57) ABSTRACT

A wavelength of pump is set to an anomalous dispersion area of an optical fiber for wavelength conversion and pump power is set to be larger than a predetermined threshold of MI so that wavelength conversion capable of flattening conversion efficiency spectrum within a wide bandwidth is permitted. A pumping source can oscillate a lightwave having a wavelength in the anomalous dispersion region of the optical fiber for wavelength conversion and intensity which can flatten the conversion efficiency spectrum over the wide bandwidth. By causing the DFWM by setting the wavelength of the pump to a wavelength $\lambda_p$ with respect to an optical signal having a center wavelength $\lambda_s$, the optical signal is converted to a wavelength $\lambda_c = (\lambda_s \cdot \lambda_p)/(2\lambda_s - \lambda_p)$, and by previously seeking the wavelength $\lambda_s$ of the optical signal before conversion and the wavelength $\lambda_c$ of the optical signal after conversion, the wavelength of the pump is set to the wavelength $\lambda_p = 2(\lambda_s \cdot \lambda_c)/(\lambda_s + \lambda_c)$, and the wavelength of the pump can flatten the conversion efficiency.

22 Claims, 7 Drawing Sheets

OPTICAL FIBER TYPE WIDE BANDWIDTH WAVELENGTH CONVERTER AND WAVELENGTH CONVERTING OPTICAL FIBER USED THEREFOR

BACKGROUND OF THE INVENTION

1. Field of the Invention

The present invention relates to a fiberoptic broadband wavelength converter used as a key device for constructing an optical communication network, particularly in WDM (wavelength division multiplexing), and a wavelength converting optical fiber and a pump source used in such an apparatus.

2. Related Background Art

It is possible to generate, from three lights having frequencies $f_1$, $f_2$, $f_3$, light having frequency $f_4$ different from these frequencies, by using FWM (four wave mixing) based on third-order nonlinear polarization in an optical fiber. In this case, the frequency $f_4$ is determined by three frequencies $f_1$, $f_2$, $f_3$ and a relationship ($f_4+f_1=f_2+f_3$) is established. Here, particularly, in case of $f_1=f_2$, it is referred to as "DFWM (degenerated four wave mixing)", where generated light having frequency $f_4$ is called as idler light.

The FWM and DFWM have been applied to wavelength conversion and dispersion compensation by phase conjugate light. For example, when pump having a wavelength $\lambda_p$ (=c/$f_p$) is combined by an optical fiber through which optical signal having a wavelength $\lambda_s$ (=c/$f_s$) is propagated, by a coupler, at output end of the optical fiber, the idler light is generated by DFWM, as well as the optical signal and the pump. "c" in $\lambda_p$ (=c/$f_p$) is a speed of light in vacuum. Since the idler light is the same as the optical signal except that it has a wavelength different from that of the optical signal and has property of phase conjugation, when the pump and the optical signal are removed from the output light from the optical fiber by using a filter to pick up only the idler light, it is possible to realize a wavelength converter of the optical signal.

Nowadays, in WDM communication, it has been attempted that a bandwidth used to the optical communication has been become broader than that of the conventional EDFA (Erbium-Doped Fiber amplifier). The bandwidth of the conventional EDFA is typically inside the region of 1530 nm–1560 nm; so-called C-band. As one example, the bandwidth has been expanded to 1570 nm–1610 nm (referred as L-band) by using specially designed EDFA, Raman amplifier and so on. Concerning the broadband WDM optical communication networks based on such amplifiers, interconnection of the two independent WDM systems that are composed of the signals inside the different wavelength region, will be required. In this situation, all-optical signal processing is required and a broadband wavelength converter is expected to enhance the flexibility of the networks. Until now, a fiberoptic broadband (36 nm half width of the half maximum) wavelength converter using fiber DFWM was reported.

It is known that the bandwidth of the fiberoptic wavelength converter using the DFWM has infinite conversion bandwidth in principle under the condition that the pump wavelength coincides with the zero-dispersion wavelength of the fiber. However, in truth the conversion bandwidth is actually limited into the finite wavelength region because of the following five obstacles.

The first obstacle is chromatic dispersion variance of the optical fiber along the longitudinal direction. It is known that inhomogeneous distribution of the zero-dispersion wavelength seriously deteriorates the conversion efficiency. In other words, efficient idler generation is not expected under the large variance of the zero-dispersion wavelength.

The second obstacle is PMD (polarization-mode dispersion) of the fiber. Because of the fiber PMD difference of the SOP (state of polarization) of the pump and signal becomes larger as the lightwaves propagates. It is well-known that it is preferable to coincide the SOP of the signal with the pump in order to generate the idler light efficiently by the FWM in the optical fiber. Further, it is also known that generation efficiency of the idler light becomes zero when the SOP of the optical signal and pump are orthogonal. However, because of the following reasons, it is difficult to coincide the SOP of the signal and pump perfectly along the entire fiber length. Even if the SOP of the optical signal and the pump are coincided carefully at the input end of the optical fiber, unless PMF (polarization maintaining fiber) is used as the optical fiber and linearly polarization along an optical axis of polarization is launched into such a fiber, phase of the incident lights are changed during the propagation. In general, since there is PMD, i.e., birefringence in the optical fiber, the polarization state is not preserved. Further, since the birefringence is small and is distributed inhomogeneously along the longitudinal direction, there is no optical axis in the practical sense. Even when generalized inherent SOP such as principal state of polarization is chosen, since the magnitude of the birefringence itself is small and is thermally unstable, a stable wavelength conversion is impossible. In general, phase change of the lightwave during propagation induces the change of the SOP. When we put difference of the wavelength between the optical signal and the pump as $\Delta\lambda$, phase difference $\Delta\phi$ (a quantity representing difference of SOP between pump and signal) is represented as:

$$\Delta\phi = -\frac{2\pi}{\lambda_p^2} \cdot \Delta n \cdot \Delta\lambda \cdot L \propto \Delta\lambda \cdot L \qquad (3)$$

where, $\Delta n$ is birefringence induced refractive index difference, L is the fiber length, and $\lambda_p$ is a wavelength of the pump.

As can be seen from the above equation (3), the phase difference $\Delta\phi$ is proportional to both the wavelength difference $\Delta\lambda$ and the length L of the optical fiber. Accordingly, the larger the wavelength differences $\Delta\lambda$ increases, the larger the influence of change of polarization increases and it becomes more difficult to avoid the deterioration of the conversion efficiency due to PMD during the propagation. In order to solve this problem, it has been attempted that the phase difference between the pump and the signal be decreased by reducing contribution of L in the above equation (3) by using a polarization maintaining high nonlinearity optical fiber or extremely shortening the length L of the high nonlinearity optical fiber without polarization maintaining characteristics.

The third obstacle is the fact that the pump wavelength and the zero dispersion wavelength cannot be equalized exactly. Although the conversion bandwidth becomes infinite only when the wavelength of the pump is completely coincided with the zero dispersion wavelength of the optical fiber, even if they are slightly deviated from each other, the infinite converting bandwidth cannot be realized. However, for the practical sense, it is almost impossible to completely equalize the wavelength of the pump to the zero dispersion wavelength of the optical fiber.

The fourth obstacle is effect (high order effect of dispersion) of the fourth-order group velocity dispersion of the fiber. In general, in order to generate DFWM efficiently, the following phase matching conditions must be satisfied regarding both frequency of light and the propagation constant β:

$$2\omega_p = \omega_s + \omega_c \quad (4)$$

$$2\beta(\omega_p) = \beta(\omega_s) + \beta(\omega_c) \quad (5)$$

Where, ω is angular frequency and has a relationship between the angular frequency and the frequency f is ω=2πf.

In general, when the DFWM in the optical fiber is considered, phase matching of the frequency and phase matching of the propagation constant must be satisfied simultaneously. In this case, since the phase matching of the frequency can easily be realized, we should concentrate on realizing the phase matching of the propagation constant. When the broadband wavelength conversion based on the DFWM is considered, phase mismatch Δβ of the propagation constant β is represented as follows:

$$\Delta\beta \equiv \beta(\omega_c) + \beta(\omega_s) - 2\beta(\omega_p) = 2\sum_{m=1}^{\infty} \frac{1}{(2m)!}\left(\frac{d^{2m}\beta}{d\omega^{2m}}\right)_{\omega=\omega_p} \Delta\omega^{2m} \quad (6)$$

Here, the frequency interval Δω is as follows:

$$\Delta\omega \equiv \omega_c - \omega_p = \omega_p - \omega_s \quad (7)$$

In this way, the phase mismatch Δβ of the propagation constant β comprises of even-order term, and, in general, second order term (so called second order group velocity dispersion) is dominant. This term represents the chromatic dispersion coefficient at the wavelength of the pump. Thus, the DFWM can be generated efficiently by equalizing the wavelength of the pump to the zero dispersion wavelength of the fiber. Furthermore, when the SOP of the pump and the signal are coincided with each other, the bandwidth of the wavelength conversion becomes infinite theoretically. However, as described in connection with the third obstacle, in actual, it is impossible to coincide the wavelength of the pump with the zero dispersion wavelength of the optical fiber, and, even if the wavelength of the pump is slightly deviated from the zero dispersion wavelength, the bandwidth will be limited. In such a case, it is also conceived that the case of m=2 in the above equation (6), i.e., effect of fourth-order group velocity dispersion contributes to deterioration of the bandwidth.

The fifth obstacle for limiting the bandwidth of the wavelength conversion is decoherence between pump and signal. In general, in order to generate the efficient DFWM in the optical fiber, the length of the optical fiber L must be reduced smaller than the coherent length defined by the following equation (8):

$$L_{coh} \equiv \frac{2\pi}{|\Delta\beta|} \quad (8)$$

Based on the above (8) and the equation (6) in which assuming the second-order term is dominant, the following relation can be derived, and the bandwidth of the wavelength conversion is limited by this relation:

$$|\Delta\omega| \leq \sqrt{\frac{2\pi}{L}\left|\left(\frac{d^2\beta}{d\omega^2}\right)^{-1}\right|_{\omega_p}} \quad (9)$$

The bandwidth of the wavelength conversion is limited by the above-mentioned five obstacles. FIG. 1 represents a comparison of conversion efficiency spectrum actually measured by using an HNL-DSF (high nonlinearity dispersion shift optical fiber) and a result of numerical calculation performed by using parameters of such an optical fiber. The measured result is shown by the filled circle (●) (a) in FIG. 1 and the numerical calculation result (theoretical value) is shown by the solid line (b) in FIG. 1. The vertical axis in FIG. 1 represents conversion efficiency and the horizontal axis represents a difference between the wavelength $\lambda_c$ of the idler and the wavelength $\lambda_p$ of the pump. In the measurements, the wavelength of the pump was equalized to the zero dispersion wavelength of the optical fiber. The maximum conversion efficiency was −14.8 dB and 3 dB bandwidth (half width) was 22.7 nm. The numerical calculation was made by numerically integrating a basic equation of DFWM obtained by considering only the linearly polarization and by regarding nonlinear polarization as scalar quantity. In this way, in the scalar approximation, influence of SOP mismatch between the optical signal and the pump is not included in the theory. This means that two polarization states always coincide with each other. In this case, in the solution of the scalar equation, when the pump wavelength is coincided with the zero dispersion wavelength, the conversion efficiency spectrum becomes flat and has the infinite bandwidth, and, thus, the solid line (b) in FIG. 1 becomes parallel to the horizontal axis. However, as shown in FIG. 1, the conversion efficiency has the finite bandwidth, and, as the $\lambda_c - \lambda_p$ increases, the conversion efficiency is deteriorated. It is considered that this deterioration comes from one of the above-mentioned five obstacles or combination thereof.

DISCLOSURE OF THE INVENTION

The Inventors conceived optical parametric amplification to reduce the above-mentioned five obstacles to broaden the conversion wavelength bandwidth and flatten the conversion efficiency spectrum. A calculation result of the conversion efficiency obtained from the optical parametric amplification is shown in FIG. 2. The vertical axis in FIG. 2 indicates the conversion efficiency and the horizontal axis indicates a wavelength difference between the wavelength $\lambda_c$ of the idler and the wavelength $\lambda_p$ of the pump. FIG. 2 shows a typical example. From the figure, it is appeared that wavelength dependence of the conversion efficiency spectrum has the following properties. ① As wavelength interval of the pump and the optical signal are increased, the conversion efficiency of the corresponding idler light increases. ② Once the conversion efficiency becomes maximum when the wavelength interval of the pump and the signal reaches a certain value, even if the wavelength intervals are further increased, the conversion efficiency decreases. ③ As the bandwidth is increased until the conversion efficiency becomes maximum, conversion efficiency increases monotonically. The property ③ is opposite to the property of the curve (a). The measured result (measured result of the wavelength conversion using an HNL-DSF) is shown in FIG. 1. The Inventors conceived that the conversion efficiency spectrum may be flattened in a wider range by compensating for the deterioration of the wavelength conversion bandwidth caused by the above-mentioned five obstacles by using the above property ③ of the optical parametric amplification.

To verify the above discussion the Inventors made experiment. The result is shown in FIG. 3. The vertical axis in FIG. 3 indicates the conversion efficiency and the horizontal axis indicates a difference between the wavelength $\lambda_c$ of the idler and the wavelength $\lambda_p$ of the pump. The result shown in FIG. 3 is obtained from an experiment of the wavelength conversion by using another HNL-DSF different from the optical fiber used in the measurement shown in FIG. 1 and by changing the wavelength of the signal. In FIG. 3, open circle (○) (a) represents the conversion efficiency spectrum measured by coinciding the wavelength of the pump with the zero dispersion wavelength of the optical fiber, and the filled circle (●) (b) represents the conversion efficiency spectrum measured while the wavelength of the pump is in anomalous dispersion region to flatten the conversion efficiency spectrum. From FIG. 3, it is verified that the deterioration of the wavelength conversion bandwidth caused by the above-mentioned five obstacles was compensated for by the optical parametric amplification. In the measurement, it was verified that, if the wavelength of the pump is shifted toward the anomalous dispersion region more than the case shown in FIG. 3, the effect of the optical parametric amplification increases and the wavelength flatness is lost.

The Inventors made further investigation and developed a fiberoptic wavelength converter (present invention) in which the property of the conversion efficiency spectrum of the optical parametric amplification and the above-mentioned property of bandwidth limitation can be cancelled by setting the pump wavelength in an optimum anomalous dispersion region of the optical fiber.

The optical parametric amplifier has broader conversion bandwidth than that of a conventional wavelength converter in which solely DFWM is generated by coinciding the wavelength of the pump with the zero dispersion wavelength.

FIG. 4 shows a measurement result obtained by using an HNL-DSF having a length of 100 m. The vertical axis in FIG. 4 indicates the conversion efficiency and the horizontal axis indicates a wavelength difference between the wavelength $\lambda_c$ of the idler and the wavelength $\lambda_p$ of the pump. The zero dispersion wavelength of the HNL-DSF in the measurement was 1564.2 nm. Further, average power of the pump was 24.1 dBm (257 mW). A phase modulation and an intensity modulation were both applied to the pump to avoid influence of stimulated Brillouin scattering. In FIG. 4, the result shown by ○ is a result obtained when the wavelength of the pump is coincided with the zero dispersion wavelength of the HNL-DSF. In this case, because of the above-mentioned reasons, as the bandwidth is broadened, i.e., as the value ($\lambda_c - \lambda_p$) is increased, the conversion efficiency is deteriorated monotonically. In FIG. 4, the result shown by X points is a result obtained when the pump wavelength is set in the anomalous dispersion region to maximize the conversion efficiency at $\lambda_c - \lambda_p = 30$ nm. In this case the pump wavelength was 1565.2 nm. It is apparent from the result that at region of the large value of the quantity $\lambda_c - \lambda_p$, the larger conversion efficiency is realized in the case of X in comparison of the case of ○. However, tilt of the conversion efficiency spectrum of the two cases is totally almost equivalent. For realizing the sufficiently flat conversion efficiency spectrum, the Inventors optimized the pump wavelength to maximize the conversion efficiency at $\lambda_c - \lambda_p = 40$ nm. The condition is realized when the pump wavelength is 1564.9 nm. A result of the measurement is shown by filled circle of the FIG. 4. Apparently, in comparison with the other results shown by the ○ and X, conversion spectrum with good flatness in the broader bandwidth was realized. From the result, it is verified the optimized parametric amplification can compensate for the tilt of the conversion efficiency spectrum. Further, the dotted line a and the solid line shown in FIG. 4 are obtained by fitting the each of the above result by third-order polynomial. Evaluating from these fitting curves, in the case of $\lambda_p = 1564.9$ nm, only 0.5 dB tilt inside the bandwidth of 30 nm is realized.

Next, the principle of the present invention will be explained precisely. In order to generate the optical parametric amplification, it is required that the pump is in the anomalous dispersion region of the fiber and the pump power must be larger than the threshold of the MI (modulational instability), and, in this case, the highly efficient wavelength conversion can be realized. Particularly when the intensity-dependent phase matching condition is satisfied between the wavelength of the optical signal and the wavelength of the pump, the conversion efficiency becomes maximum. The phase matching condition under the conventional DFWM is represented as follows:

$$\Delta\beta = -\frac{2\pi\lambda_p^2}{c}D(\lambda_p)\Delta f^2 = 0 \tag{10}$$

In the case of including the effect of the optical parametric amplification, the eq. (10) is replaced as:

$$\Delta k \equiv \Delta\beta + 2\gamma P_p = -\frac{2\pi\lambda_p^2}{c}D(\lambda_p)\Delta f^2 + 2\gamma P_p = 0, \tag{11}$$

where, c is speed of light in vacuum, D is chromatic dispersion coefficient of the fiber, $\Delta f$ is a frequency difference between the signal and the pump, and $\gamma$ represents nonlinear coefficient of the fiber. Conversion efficiency $G_c$, which is defined as the ratio of the idler power and input signal power, is represented by the following equation (12):

$$G_c = (\gamma P_p L)^2 \left[\frac{\sinh(gL)}{gL}\right]^2, \tag{12}$$

where, g is parametric gain which is defined by the following equation (13):

$$g = \tfrac{1}{2}\sqrt{-\Delta\beta(\Delta\beta + 4\gamma P_p)} = \tfrac{1}{2}\sqrt{-(\Delta\beta + 2\gamma P_p)^2 + (2\gamma P_p)^2} \tag{13}$$

From the above equations (12) and (13), when "g" is real, the parametric amplification is induced and the conversion efficiency increases exponentially with respect to L. Thus, in order to induce the parametric amplification, the following relationship (14) must be satisfied:

$$\Delta\beta < 0 \text{ and } \Delta\beta + 4\gamma P_p > 0 \tag{14}$$

The relationship (14) means that, in order to generate the parametric amplification, the wavelength of the pump should be in the anomalous dispersion region and the pump power must satisfy the following condition (15):

$$P_p > -\frac{\Delta\beta}{4\gamma} \tag{15}$$

The right hand side of the relationship (15) is called as "threshold of MI (modulational instability)". From the equation (13), it can be seen that the conversion efficiency $G_c$ becomes maximum when the phase matching condition shown by the equation (11) is satisfied.

From the above discussion, in order to generate the optical parametric amplification, it is required that the pump wavelength must be set to the anomalous dispersion region of the fiber and the pump power satisfies the equation (15). In this case, the highly efficient wavelength conversion can be realized. Particularly when the effective phase matching condition of the equation (11) is satisfied between the signal and the pump, the conversion efficiency becomes maximum. Based on the theory, the fact that the parametric amplification can compensate for the deterioration of the conversion efficiency in broadband region will be explained hereinbelow.

FIG. 5 shows a result of calculation of the conversion efficiency while the wavelength of pump having larger power than the threshold of MI is being gradually shifted from the zero dispersion wavelength to a longer wavelength region (anomalous dispersion region). The vertical axis in FIG. 5 indicates the conversion efficiency and the horizontal axis indicates the wavelength difference between the wavelength $\lambda_c$ of the wavelength conversion light (idler) and the wavelength $\lambda_p$ of the pump. In the calculation, since the zero dispersion wavelength of the optical fiber is 1559.3 nm and dispersion slope is selected to 0.07 ps/nm²/km, the longer wavelength side from the zero dispersion are becomes the anomalous dispersion region. The pump power $P_p$ is fixed to 27 dB. From FIG. 5, the wavelength dependence of the conversion efficiency spectrum is characterized as follows. When the pump wavelength is set to be longer than the zero-dispersion wavelength of the optical fiber, the gradient of the conversion efficiency spectrum in the vicinity of $\lambda_c-\lambda_p=0$ becomes larger as the pump wavelength is longer. In addition, for a given pump power the conversion efficiency spectrum has a maximal value when $\lambda_c-\lambda_p$ satisfies the condition of eq. (11). The conversion efficiency decreases monotonically over the maximal value. As shown in FIG. 5, in the vicinity of the $\lambda_c-\lambda_p=0$, the sign of the gradient of the conversion efficiency spectrum is opposite to the gradient of the tilt due to the five obstacles appeared in the preceding discussion. Consequently the tilt can be compensated for by an optimized parametric amplification induced from a suitable pump power and wavelength.

Next, a role of the pump power in the optical parametric amplification is discussed. As shown in the above equations (12) and (13), the gain of the conversion efficiency shown in FIG. 5 also depends upon power of the pump. In order to verify the fact, calculations were made with changing the pump power. The parameters of the optical fiber used in the calculation are same as used the calculation shown in FIG. 5 and the wavelength of the pump is fixed to 1565.0 nm. A calculation result is shown in FIG. 6. The vertical axis in FIG. 6 indicates the conversion efficiency and the horizontal axis indicates a difference between the wavelength $\lambda_c$ of the wavelength conversion light (idler) and the wavelength $\lambda_p$ of the pump.

From the results shown in FIG. 6, it can be seen that, when the pump power is small, for example when the pump power is 17 dBm and 20 dBm, the conversion efficiency simply becomes large with conserving the similar spectrum shape. However, if the pump power is increased sufficiently, the parametric amplification is generated, the spectrum shape changes as shown in FIG. 5. Accordingly, for a given fiber, to realize a sufficiently flat conversion efficiency spectrum the optimum pump power can be determined by changing the pump power in this way. In this case, the wavelength of the pump must be inside the anomalous dispersion region of the optical fiber. In principle, in the degenerated four wave mixing, since the signal frequency and the idler frequency are placed symmetrically around the pump, the conversion efficiency spectrum becomes a symmetrical shape around the pump. According to the above-mentioned theory, the present invention is embodied as follows.

The present invention relates to a fiberoptic broadband wavelength converter. According to an aspect of the present invention, the apparatus is characterized in that a pump wavelength is set in an anomalous dispersion region of an optical fiber for wavelength conversion and pump power is set to be larger than a threshold of MI so that wavelength conversion with highly flattened conversion efficiency spectrum in a wide bandwidth is realized by degenerated four wave mixing (DFWM) with optical parametric amplification.

According to another aspect of the present invention, in the fiberoptic broadband wavelength converter, a pump light source can oscillate pump having a wavelength and intensity which can flatten the conversion efficiency within the wide bandwidth inside the anomalous dispersion region of the optical fiber used for wavelength conversion.

According to a further aspect of the present invention, in the fiberoptic broadband wavelength converter, signal of a center wavelength is $\lambda_s$, it is wavelength-converted by using a pump with wavelength $\lambda_p$ through DFWM. It is shown that the idler (converted wave) wavelength is represented as in the following equation (1):

$$\lambda_c = \frac{\lambda_s \lambda_p}{2\lambda_s - \lambda_p} \tag{1}$$

and the wavelength of the pump is set to the wavelength represented by the following equation (2) to realize wavelength conversion from a signal wavelength $\lambda_s$ to the wavelength $\lambda_c$ of the optical signal after conversion:

$$\lambda_p = \frac{2\lambda_s \lambda_c}{\lambda_s + \lambda_c} \tag{2}$$

and the wavelength of the pump that is set in the anomalous dispersion region of the fiber to flatten the conversion efficiency spectrum within the wide bandwidth for wavelength conversion.

According to a still further aspect of the present invention, concerning the fiberoptic broadband wavelength converters, under the condition that the pump power and wavelength are both kept constant, bandwidth of the conversion efficiency is evaluated through measuring the conversion efficiency by deviating the signal wavelength from the pump wavelength, and repeating the same evaluation by changing the pump wavelength from the zero dispersion wavelength of the fiber to a wavelength inside the anomalous dispersion region, a pump wavelength at which a sufficiently flattened conversion efficiency spectrum is realized, is found, and the determined wavelength is used as the pump wavelength for broadband wavelength conversion.

According to a yet further aspect of the present invention, in the fiberoptic wavelength converter, under a condition that the pump power is kept constant, measurement of the conversion efficiency is made to determine the optimized pump wavelength in anomalous dispersion region of the fiber by changing the pump and signal wavelength with preserving the wavelength interval of the two lightwaves constant, and, a pump wavelength that realizes the maximum conversion efficiency is used as the wavelength of the pump for broadband wavelength conversion.

According to a further aspect of the present invention, in the fiberoptic broadband wavelength converter, a length of the optical fiber for wavelength conversion as medium for the DFWM is smaller than 200 m.

According to a further aspect of the present invention, in the fiberoptic broadband wavelength converter, when the wavelength of the pump is set in the anomalous dispersion region of the optical fiber for wavelength conversion and the pump power is set to be greater than the threshold, wavelength conversion which can be flattened within a wide bandwidth is realized by the degenerated four wave mixing (DFWM).

DETAILED DESCRIPTION OF THE PREFERRED EMBODIMENTS

Figure 7:
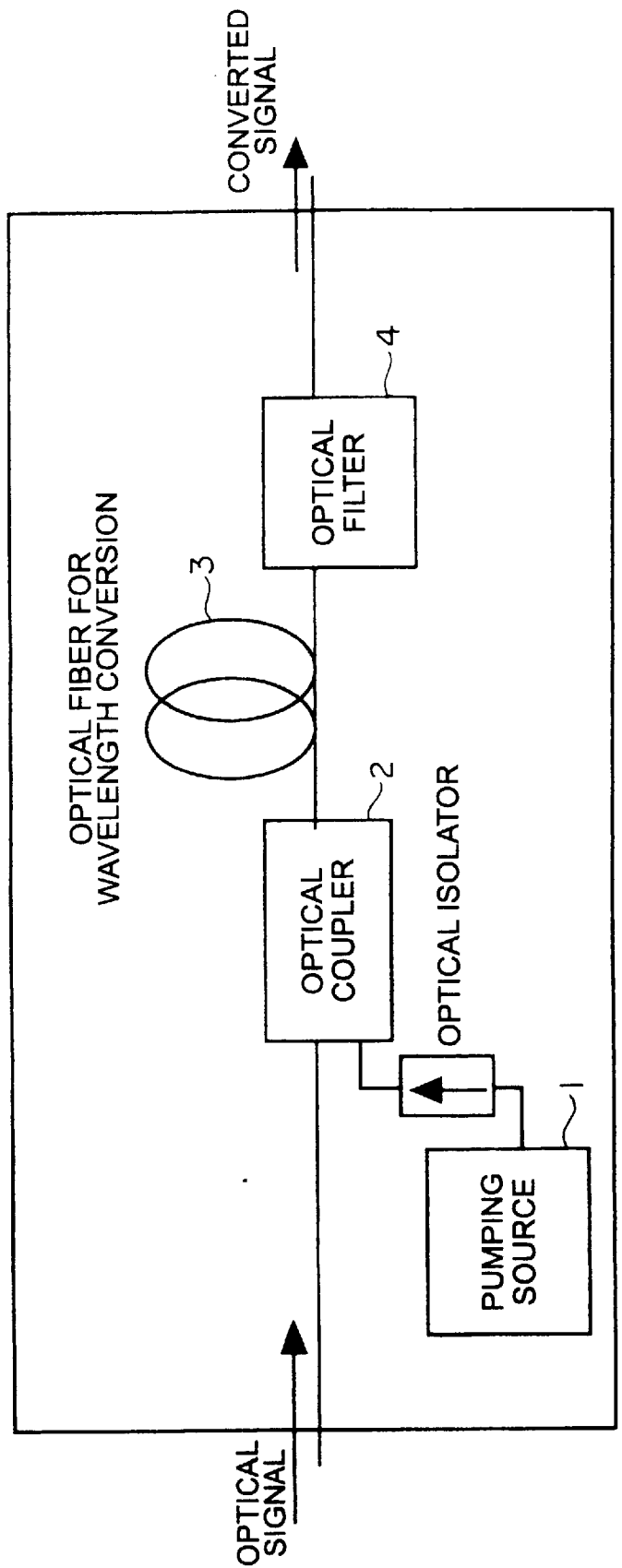
FIG. 7 is a schematic view showing an example of a fiberoptic broadband wavelength converter according to the present invention.

In a fiberoptic broadband wavelength converter according to the present invention, as shown in FIG. 7, incident optical signal and pump output from a pumping source 1 are combined by an optical coupler 2, and the combined light is launched into an optical fiber 3 for wavelength conversion, where DFWM occurs and idler is generated. An optical filter 4 set at the output end of the optical fiber 3 for wavelength conversion serves to pick up only the wavelength-converted light (idler), so that the wavelength-converted light is obtained from an output end of the apparatus.

Figure 1:
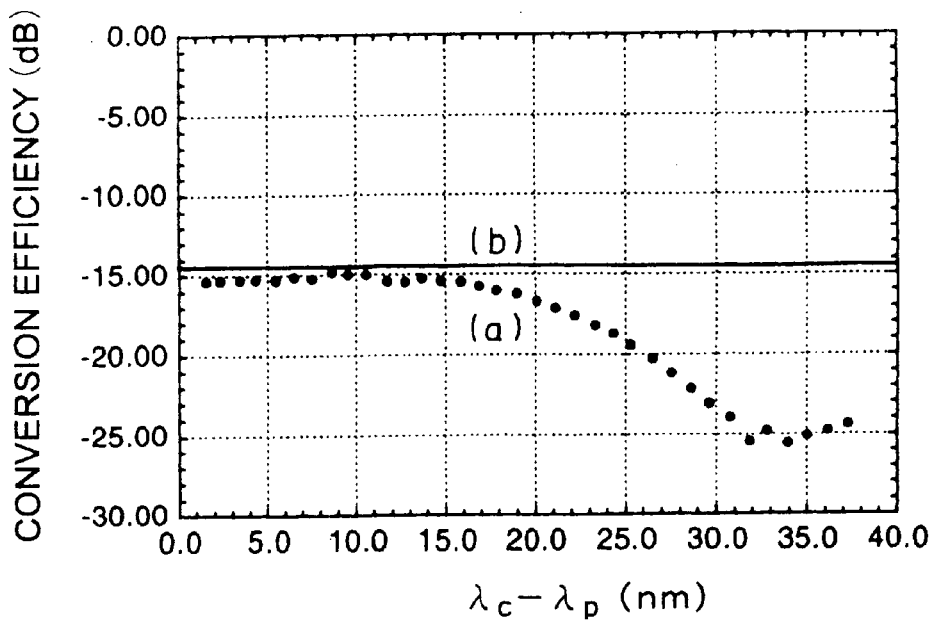
FIG. 1 is a graph showing a wavelength conversion measurement result in an optical fiber.
Figure 2:
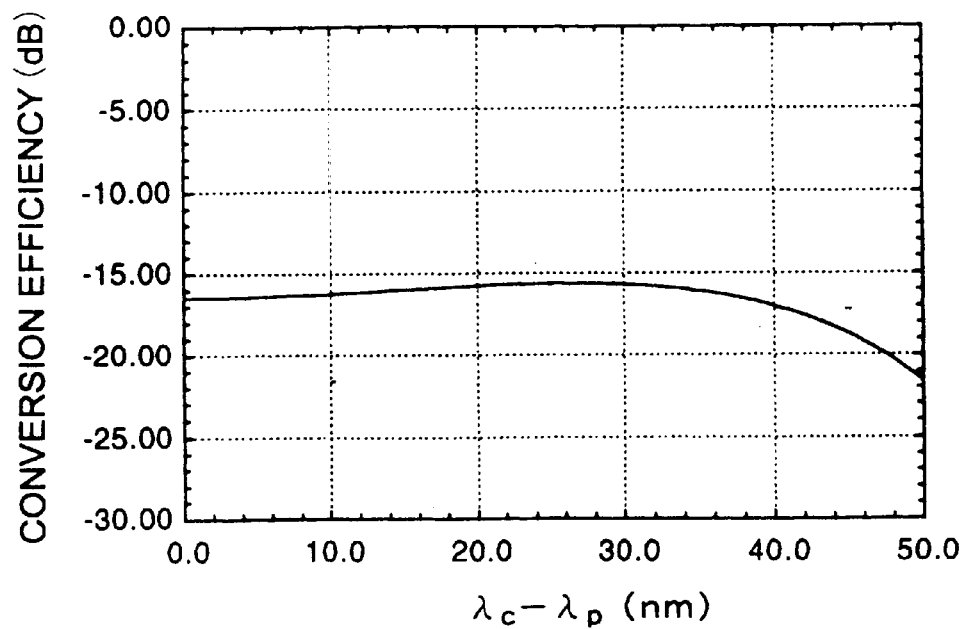
FIG. 2 is a graph showing a numerical calculation result of conversion efficiency based on parametric amplification in the optical fiber.

It is conceived a situation that pump power output from the pumping source 1 shown in FIG. 1 is 27 dBm (500 mW) and, in consideration of system design, WDM optical signals included in a bandwidth called as a C-band having a wavelength inside the region from 1530 nm to 1560 nm regarding the optical signal and the wavelength conversion light are simultaneously converted to a WDM signal inside a wavelength region from 1570 nm to 1561 nm. Under the situation of the simultaneous band conversion, by the above-mentioned equation (2) or (4), it is required that a wavelength of the pump be 1565 nm. Further, wavelength conversion using optical parametric amplification associated with the present invention is conceived. In case of the pump having intensity of 27 dBm, it is regarded that, when the pump is set to a longer wavelength side from zero dispersion wavelength of the optical fiber 3 for wavelength conversion by 2 nm, the facts that the pump is in an anomalous dispersion region of the fiber and that the spectrum of the parametric amplification compensates for deterioration the bandwidth of the optical fiber 3 to widen the bandwidth are known both experimentally and theoretically. This property also depends upon the other parameters of the optical fiber such as dispersion slope, nonlinear refractive index, effective area and fiber length. In this case, by designing and manufacturing an optical fiber for wavelength conversion having the same dispersion slope, nonlinear refractive index and effective area as those of the optical fiber 3, similar simultaneous wavelength conversion of desired wide bandwidths can be realized.

Here, in case of zero dispersion wavelength of 1563 nm and the pump having intensity of 27 dBm, it is regarded that, when the pump is set at a wavelength of 1565 nm different from the zero dispersion wavelength by 2 nm, the facts that the wavelength of the pump exists within the anomalous dispersion region of the optical fiber 3 for wavelength conversion and that the property of the parametric amplification compensates for deterioration of the bandwidth of the optical fiber 3 to widen the bandwidth are known experimentally and theoretically. In this case, by designing and manufacturing a pumping source 1 capable of oscillating at wavelength of 1565 nm and having peak power of 27 dBm, simultaneous wavelength conversion of wide bandwidths can be realized.

Figure 6:
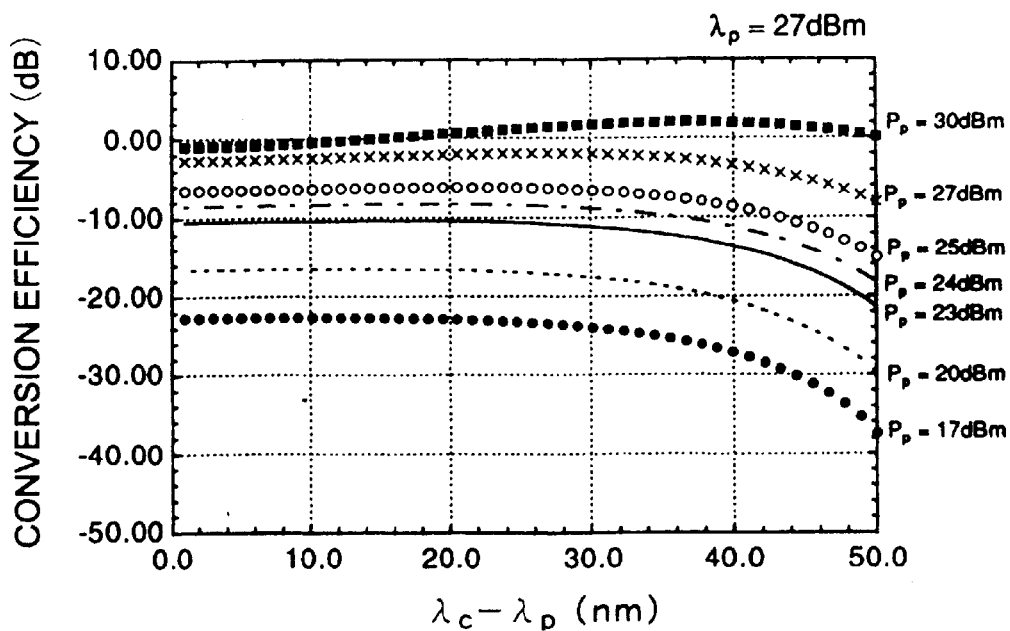
FIG. 6 is a graph showing a pump intensity property of the conversion efficiency and showing a result of calculation effected while gradually shifting pump power from 20 dBm.

Now, it is conceived a situation that zero dispersion wavelength of the fiber is 1563 nm and the pump having intensity of 27 dBm, it is regarded that, when the pump is set at a wavelength of 1567 nm different from the zero dispersion wavelength by 4 nm, the facts that the wavelength of the pump exists within the anomalous dispersion region of the optical fiber 3 and that the property of the parametric amplification compensates for deterioration of the bandwidth of the optical fiber 3 to widen the bandwidth are known experimentally and theoretically. In this case, by designing and manufacturing a light source capable of oscillating at wavelength of 1567 nm and having peak power of 27 dBm and by using such a light source as the pumping source 1, simultaneous wavelength conversion of wide bandwidths can be realized. However, it is assumed that only the pumping source capable of oscillating at wavelength of 1565 nm is prepared. As already described in connection with FIG. 6, so long as the pump exists within the anomalous dispersion region, the sufficiently flat wavelength conversion spectrum can be realized by optimizing the pump power. Although the value of the conversion efficiency differs from the value realized by using the pumping source capable of oscillating at wavelength of 1567 nm and having peak power of 27 dBm, even when the pumping source of wavelength of 1565 nm is used, a broadband wavelength converter with sufficiently flat conversion efficiency spectrum in a wide bandwidth can be realized by optimizing the peak power. In this way, simultaneous broadband wavelength conversion can be realized by adjusting the intensity of the pumping source.

Now, an embodiment of a method for determining the wavelength of the pump for achieving the wide bandwidth wavelength conversion when an optical fiber for wavelength conversion is given in this embodiment will be explained. In a condition that the pump power is kept constant, the wavelength of the pump is changed from the zero dispersion wavelength of the optical fiber toward the anomalous dispersion side. In this case, in each step changing the wavelength of the pump, the spectrum of the wavelength conversion is measured by use of a WDM signal. In this way, the wavelength of the pump corresponding to the most desired conversion efficiency spectrum is determined.

Another embodiment of a method for determining the wavelength of the pump for achieving the broadband wavelength conversion when a proper optical fiber for wavelength conversion is given will be explained in this embodiment.

Figure 8:
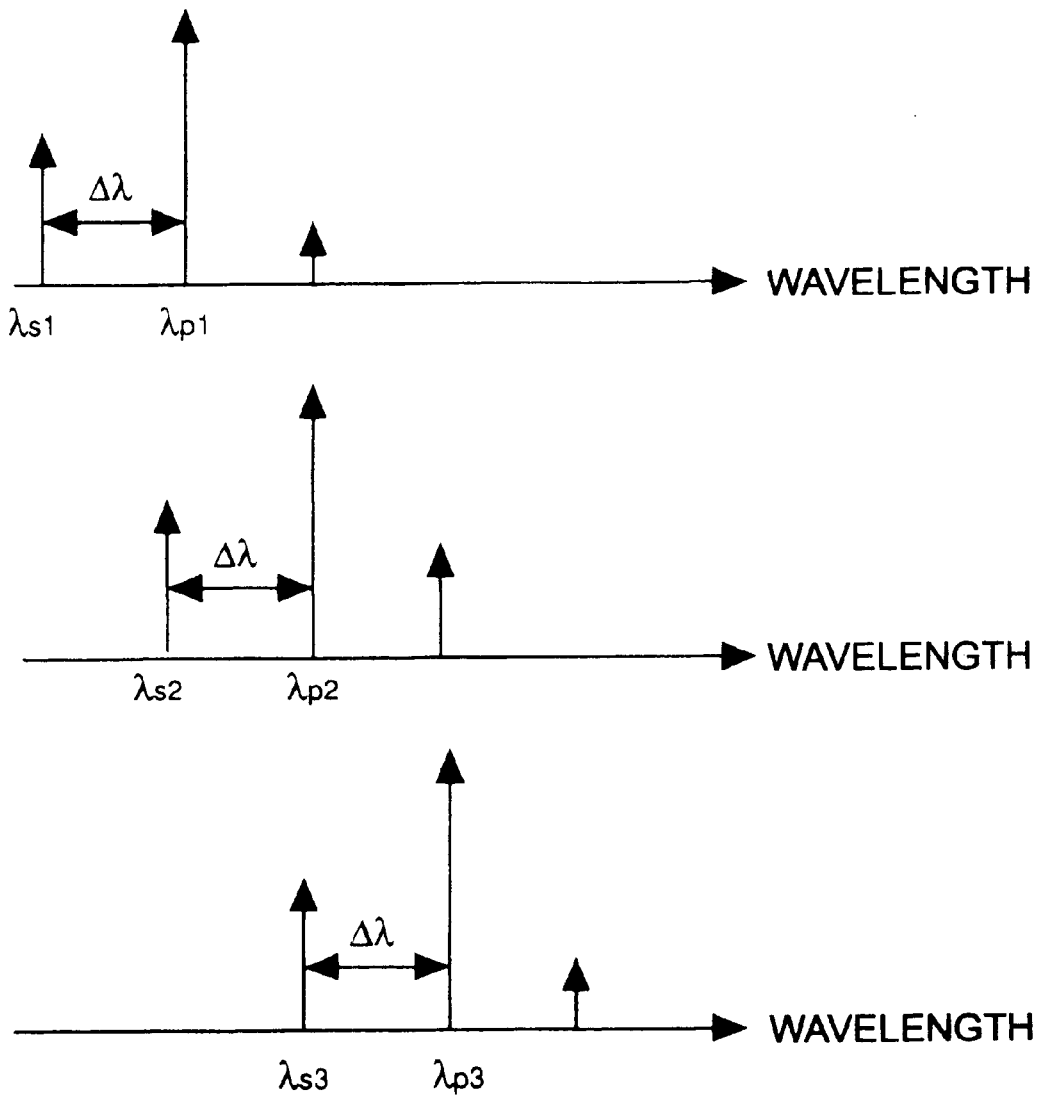
FIG. 8 is an explanatory view showing a method to determine an optimum wavelength of the pump.

The conversion efficiency spectrum is measured by changing the pump wavelength with preserving the wavelength interval $\Delta\lambda$ between pump and signal to be constant. The wavelength interval is set to the half-width of the half-maximum of the conversion efficiency spectrum. Under the condition a pump wavelength at which the maximum conversion efficiency is realized, corresponds to the optimum pump wavelength. A schematic of the measurement procedure is shown in FIG. 8. When the conversion bandwidth of 40 nm that corresponds to the half-width of the half-maximum of the conversion efficiency spectrum is required, the above measurement is made by setting $\Delta\lambda$=40 nm; interval of the signal wavelength $\lambda_{s1}$ and pump wavelength $\lambda_{p1}$ is set to be 40 nm. Conversion efficiency is calculated from the measurement of the idler as the ratio of the idler power and input signal power. As shown in the aforementioned embodiment, when pump is in anomalous dispersion region of the fiber, parametric gain changes the profile of the conversion efficiency spectrum. Since the parametric gain shown in eq. (13) depends on both the pump power and pump wavelength, in general, determination of the optimum pump wavelength is difficult. Thus, for the purpose of the simple determination of the optimized pump wavelength, pump power should not be changed throughout the measurement.

Figure 5:
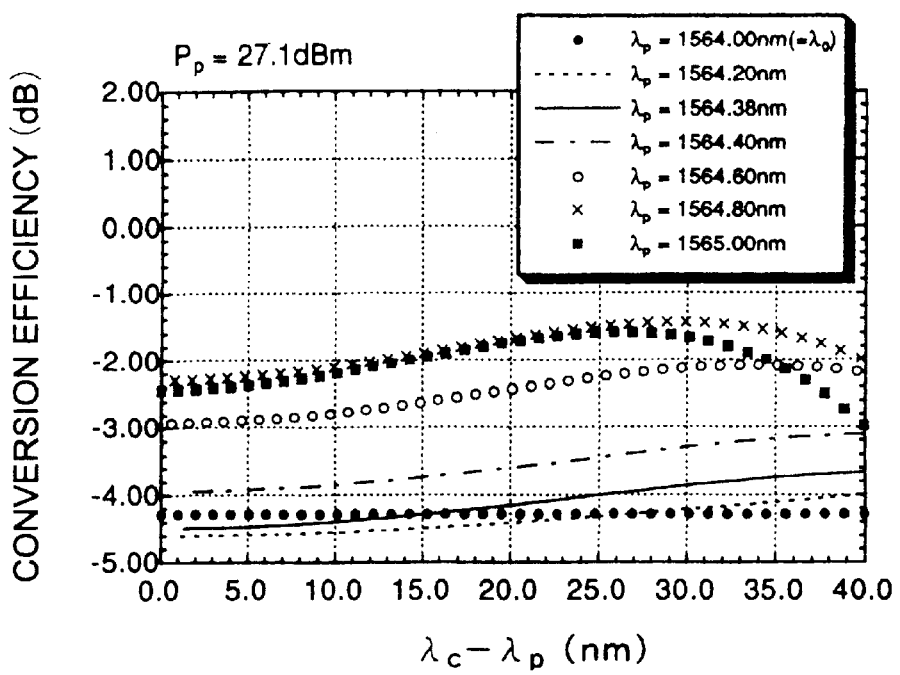
FIG. 5 is a graph showing a wavelength property of conversion efficiency and showing a result of calculation effected while gradually shifting a wavelength of pump from a zero dispersion wavelength.
Figure 9:
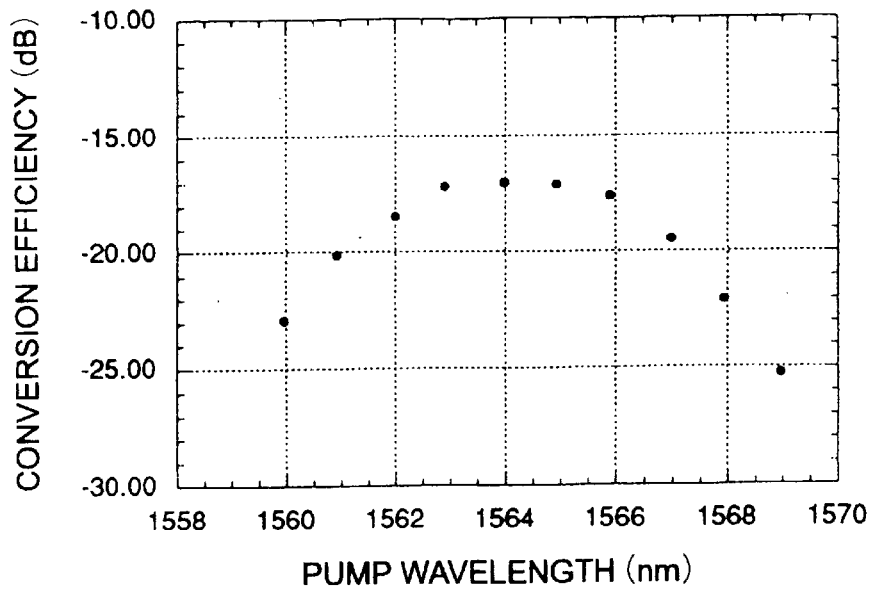
FIG. 9 is a graph showing a measurement result made to determine the optimum wavelength of the pump when the pump power is 20 dBm.

As already shown in FIG. 5, when the suitable parametric amplification is generated, the deterioration of the bandwidth due to the precedingly discussed five obstacles can be effectively neglected. In this case, as the interval between the optical signal and the pump is increased, the conversion efficiency is gradually increased, and, the conversion efficiency becomes maximum when the interval between the optical signal and the pump reaches a certain value. If the interval is further enlarged to exceed the bandwidth corresponding the maximum value, the conversion efficiency decreases monotonically. In such a case, the deterioration of the bandwidth due to the precedingly discussed first to fourth obstacles (among first to fifth obstacles) cannot be compensated for. Accordingly, when the conversion efficiency is flattened in the required bandwidth, by fixing the interval between the optical signal and the pump to that bandwidth interval and by determining the optimum wavelength of the pump at which the conversion efficiency becomes largest, the optimum wavelength of the pump for the simultaneous broadband wavelength conversion can be determined. FIG. 9 shows a result of the measurement by using this method under a condition that the wavelength interval $\Delta\lambda$ between the optical signal and the pump is 20 nm and the pump power is 20 dBm. In FIG. 9, the vertical axis indicates the conversion efficiency and the horizontal axis indicates the wavelength of the pump.

Figure 3:
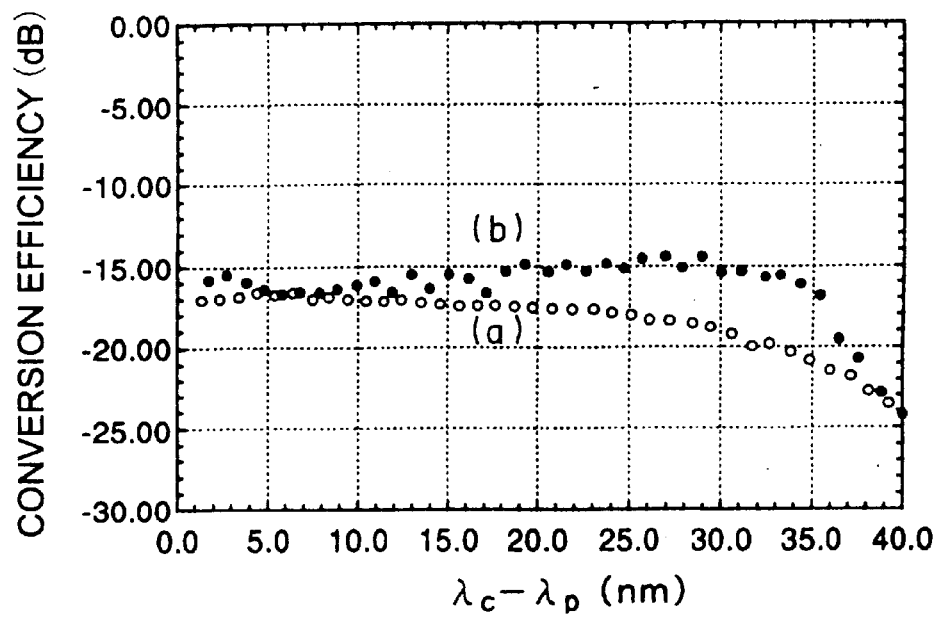
FIG. 3 is a graph showing a wavelength conversion measurement result.
Figure 4:
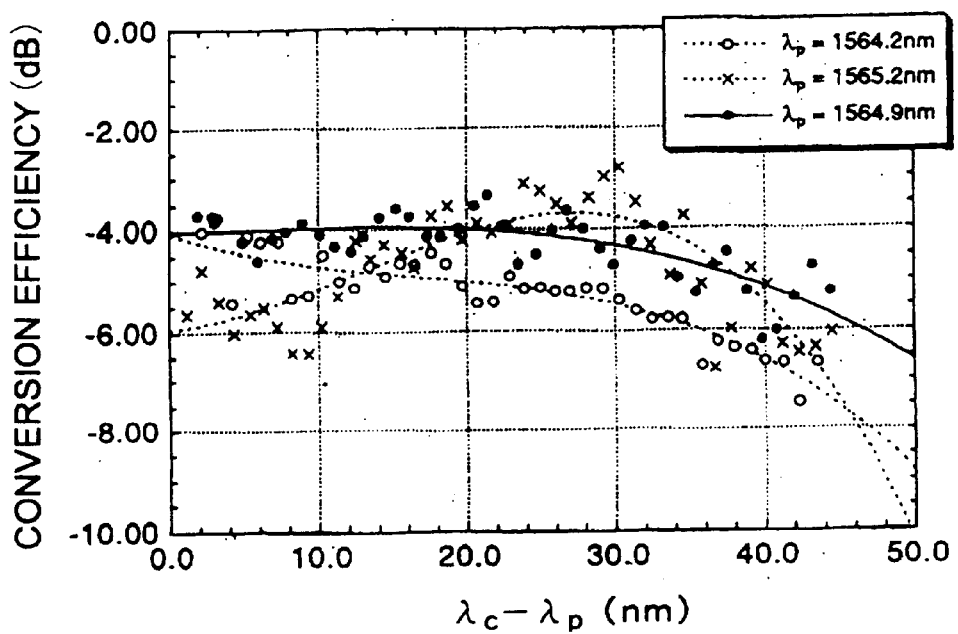
FIG. 4 is a graph showing a measurement result made to verify the fact that wavelength conversion spectrum well flattened in a wide bandwidth can be realized when a property of wavelength conversion based on degenerated four wave mixing and deterioration of the conversion efficiency spectrum is compensated for by optical parametric amplification.
Figure 10:
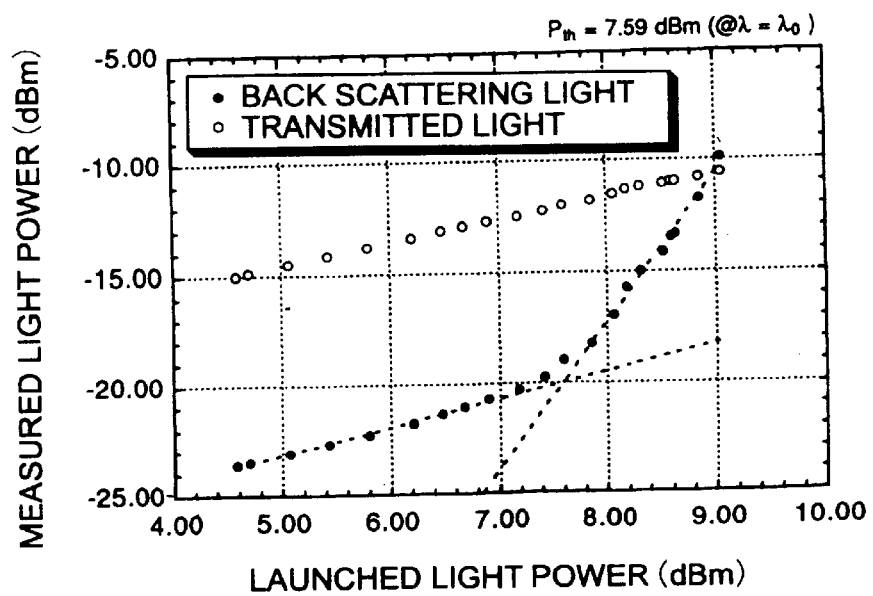
FIG. 10 is a graph showing a result of measurement of an SBS threshold of a 24.5 km long optical fiber for wavelength conversion.

When the length of the optical fiber for wavelength conversion is long, the bandwidth is limited by the deterioration of the bandwidth due to the above-mentioned five obstacles. Particularly when a considerably long optical fiber for wavelength conversion is used, the deterioration due to the five obstacles is very serious. Further, in the long optical fiber for wavelength conversion, since the influence of stimulated Brillouin scattering (SBS) cannot be avoided, the pump power sufficient to generate the optical parametric amplification cannot be launched into the optical fiber. FIG. 10 shows a measurement result of SBS thresholds in an optical fiber having a length of 24.5 km and made of the same material as that of the optical fiber used in the test shown in FIG. 3. In FIG. 10, the vertical axis indicates the measured light intensity (dBm) and the horizontal axis indicates incident light intensity (dBm). The SBS threshold is 7.6 dBm, and, from the result in FIG. 10, the incident light intensity is already limited in the vicinity of 9 dBm. In this condition, it is impossible to input the strong light power required for optical parametric amplification to the optical fiber.

Figure 11:
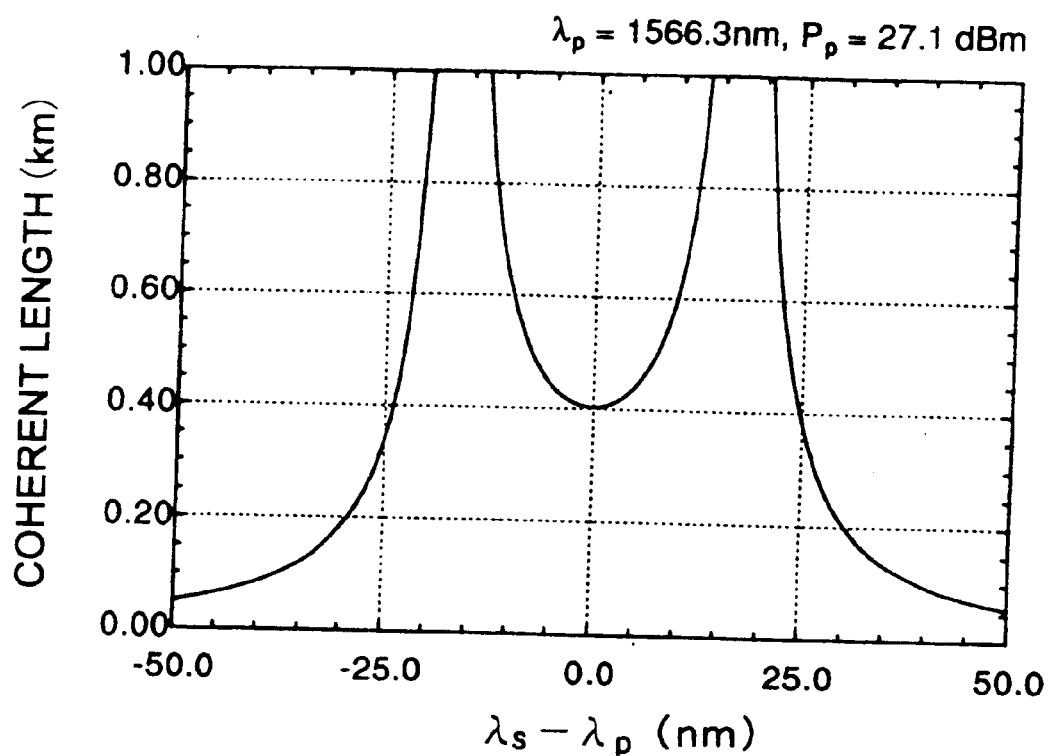
FIG. 11 is a graph showing a calculation result regarding a relationship between a difference between an optical signal and the pump in DFWM and a coherent length.

Next, an example of calculation of theoretical evaluation result of a coherent length is shown in FIG. 11. In the calculation, as will be described hereinbelow, the parameters of the optical fiber used in the test shown in FIG. 10 is used. That is to say, the zero dispersion wavelength is 1564.0 nm, dispersion slope is 0.03 ps/nm²/km, loss is 0.61 dB/km and nonlinear coefficient is 15.17 $W^{-1}km^{-1}$. When the wavelength of the pump is located in the anomalous dispersion region of the 1566.3 nm and the pump power is 27.1 dBm, since the phase matching condition is given by the above equation (11), the coherent length ($L_{coh}$) is represented by the following equation (16) from the above equation (8) in correspondence to the phase matching condition:

$$L_{coh} = \frac{2\pi}{|g|} \quad (16)$$

FIG. 11 shows the result. In FIG. 11, the vertical axis indicates the coherent length and the horizontal axis indicates a difference of the wavelength between the wavelength $\lambda_s$ of the signal and the wavelength $\lambda_p$ of the pump.

It is known that efficient DFWM is not caused so long as the length of the fiber is greater than the coherent length. Empirically, when the length of the fiber is greater than 200 m, the effective DFWM is not caused in the wavelength interval (between the optical signal and the pump) greater than 30 nm. Since the bandwidth of C-band is 30 nm, in order to realize the broadband (more than 30 nm) wavelength conversion utilizing the parametric amplification, the length of the fiber must be smaller than 200 m. Since the SBS threshold is increased as the length is decreased, the influence thereof can be avoided. Thus, it is desired that the wavelength conversion be realized by using a short optical fiber having a length smaller than 200 m. Similarly, when the bandwidth is 40 nm, an optical fiber having a length smaller than about 100 m may be used, and, when the bandwidth is further great, the same conception can be applied.

In the fiberoptic broadband wavelength converter according to the present invention, as the optical fiber for wavelength conversion, an optical fiber in which the wavelength of the pump can be located in the anomalous dispersion region of the optical fiber for wavelength conversion and when the pump power is set to be greater than the threshold of MI the wavelength conversion for effecting the flattening in the wide bandwidth based on the degenerated four wave mixing (DFWM) can be achieved is used.

Effect of the Invention

In the fiberoptic broadband wavelength converter and the optical fiber for wavelength conversion according to the present invention, by compensating for the deterioration of the conversion efficiency due to PMD with the parametric amplification by shifting the wavelength of the pump from the zero dispersion wavelength toward the anomalous dispersion region of the fiber, even when the interval between the pump and the wavelength conversion light is increased, the conversion efficiency spectrum is not deteriorated, and the broadband wavelength converter providing sufficient wavelength flatness can be achieved. In such an all-optical optical wavelength converter, in the switching handling utilizing the wavelength conversion, the wavelength range of the converted optical signal can be widened, which is useful for wavelength division multiplexing communication networks in the future.

What is claimed is:

1. A fiberoptic broadband wavelength converter wherein: a wavelength of pump is set in an anomalous dispersion region of an optical fiber for wavelength conversion and pump power is set to be greater than a predetermined threshold of modulational instability (MI) so that wavelength conversion capable of flattening conversion efficiency within a wide bandwidth is realized by degenerated four wave mixing (DFWM).

2. A fiberoptic broadband wavelength converter according to claim 1, wherein a pumping source can oscillate a lightwave having a wavelength and intensity which can flatten the conversion efficiency within the wide bandwidth in the anomalous dispersion region of said optical fiber for wavelength conversion.

3. A fiberoptic broadband wavelength converter according to claim 2, wherein, a center wavelength of the optical signal is $\lambda_s$, and a wavelength of pump is $\lambda_p$ by causing the DFWM, the wavelength of the wavelength-converted optical signal is represented in the following equation (1):

$$\lambda_c = \frac{\lambda_s \lambda_p}{2\lambda_s - \lambda_p} \quad (1)$$

and the wavelength of the pump is set to the wavelength represented by the following equation (2) by previously setting the wavelength $\lambda_s$ of the optical signal before conversion and the wavelength $\lambda_c$ of the optical signal after conversion:

$$\lambda_s = \frac{2\lambda_s \lambda_c}{\lambda_s + \lambda_c} \quad (2)$$

and the wavelength of the pump can be flattened within the wide bandwidth in the anomalous dispersion region of the said optical fiber for wavelength conversion.

4. A fiberoptic broadband wavelength converter according to claim 2, wherein, in a condition that the pump power and wavelength are both kept constant, bandwidth of the conversion efficiency is evaluated through measuring the conversion efficiency by deviating the signal wavelength from the pump wavelength, and repeating the same evaluation by changing the pump wavelength from the zero dispersion wavelength of the fiber to a wavelength inside the anomalous dispersion region, a pump wavelength at which a sufficiently flattened conversion efficiency spectrum is realized, is found, and the determined wavelength is used as the pump wavelength for broadband wavelength conversion.

5. A fiberoptic broadband wavelength converter according to claim 2, wherein, in a condition that the pump power is kept constant, preserving interval between the wavelength of the pump and the wavelength of the optical signal to be constant by changing lie wavelength of the pump from the zero dispersion wavelength toward the anomalous dispersion region of said optical fiber for wavelength conversion, intensity of idler generated by the DFWM is measured while changing the wavelength of the pump from the zero dispersion wavelength toward the anomalous dispersion region, and a wavelength obtained at the maximum idler power is used as the wavelength of the pump for fiberoptic broadband wavelength conversion.

6. A fiberoptic broadband wavelength converter according to claim 2, wherein a length of the said optical fiber for wavelength conversion as medium for the DFWM is shorter than 200 m.

7. A fiberoptic broadband wavelength converter according to claim 2, when the wavelength of the pump is set in the anomalous dispersion region of the said optical fiber for wavelength conversion and the pump power is, set to be greater than the threshold of MI, wavelength conversion which can be flattened within a wide bandwidth is permitted by the degenerated four wave mixing (DFWM).

8. A fiberoptic broadband wavelength converter according to claim 1, wherein, a center wavelength of the optical signal is $\lambda_s$, and a wavelength of pump is $\lambda_p$ by causing the DFWM, the wavelength of the wavelength-converted optical signal is represented in the following equation (1)

$$\lambda_c = \frac{\lambda_s \lambda_p}{2\lambda_s - \lambda_p} \quad (1)$$

and the wavelength of the pump is set to the wavelength represented by the following equation (2) by previously setting the wavelength $\lambda_s$ of the optical signal before conversion and the wavelength $\lambda_c$ of the optical signal after conversion:

$$\lambda_s = \frac{2\lambda_s \lambda_c}{\lambda_s + \lambda_c} \quad (2)$$

and the wavelength of the pump can be flattened within the wide bandwidth in the anomalous dispersion region of the said optical fiber for wavelength conversion.

9. A fiberoptic broadband wavelength converter according to claim 8, wherein, in a condition that the pump power and wavelength are both kept constant, bandwidth of the conversion efficiency is evaluated through measuring the conversion efficiency by deviating the signal wavelength from the pump wavelength, and repeating the same evaluation by changing the pump wavelength from the zero dispersion wavelength of the fiber to a wavelength inside the anomalous dispersion region, a pump wavelength at which a sufficiently flattened conversion efficiency spectrum is realized, is found, and the determined wavelength is used as the pump wavelength for broadband wavelength conversion.

10. A fiberoptic broadband wavelength converter according to claim 8, wherein, in a condition that the pump power is kept constant, preserving interval between the wavelength of the pump and the wavelength of the optical signal to be constant by changing the wavelength of the pump from the zero dispersion wavelength toward the anomalous dispersion region of said optical fiber for wavelength conversion, intensity of idler generated by the DFWM is measured while changing the wavelength of the pump from the zero dispersion wavelength toward the anomalous dispersion region, and a wavelength obtained at the maximum idler power is used as the wavelength of the pump for fiberoptic broadband wavelength conversion.

11. A fiberoptic broadband wavelength converter according to claim 8, wherein a length of the said optical fiber for wavelength conversion as medium for the DFWM is shorter than 200 m.

12. A fiberoptic broadband wavelength converter according to claim 8, when the wavelength of the pump is set in the anomalous dispersion region of the said optical fiber for wavelength conversion and the pump power is, set to be greater than the threshold of MI, wavelength conversion which can be flattened within a wide bandwidth is permitted by the degenerated four wave mixing (DFWM).

13. A fiberoptic broadband wavelength converter according to claim 1, wherein, in a condition that the pump power and wavelength are both kept constant, bandwidth of the conversion efficiency is evaluated through measuring the conversion efficiency by deviating the signal wavelength from the pump wavelength, and repeating the same evaluation by changing the pump wavelength from the zero dispersion wavelength of the fiber to a wavelength inside the anomalous dispersion region, a pump wavelength at which a sufficiently flattened conversion efficiency spectrum is realized, is found, and the determined wavelength is used as the pump wavelength for broadband wavelength conversion.

14. A fiberoptic broadband wavelength converter according to claim 13, wherein, in a condition that the pump power is kept constant, preserving interval between the wavelength of the pump and the wavelength of the optical signal to be constant by changing the wavelength of the pump from the zero dispersion wavelength toward the anomalous dispersion region of said optical fiber for wavelength conversion, intensity of idler generated by the DFWM is measured while changing the wavelength of the pump from the zero dispersion wavelength toward the anomalous dispersion region, and a wavelength obtained at the maximum idler power is used as the wavelength of the pump for fiberoptic broadband wavelength conversion.

15. A fiberoptic broadband wavelength converter according to claim 13, wherein a length of the said optical fiber for wavelength conversion as medium for the DFWM is shorter than 200 m.

16. A fiberoptic broadband wavelength converter according to claim 13, when the wavelength of the pump is set in the anomalous dispersion region of the said optical fiber for wavelength conversion and the pump power is, set to be greater than the threshold of MI, wavelength conversion which can be flattened within a wide bandwidth is permitted by the degenerated four wave mixing (DFWM).

17. A fiberoptic broadband wavelength converter according to claim 1, wherein, in a condition that the pump power is kept constant, preserving interval between the wavelength of the pump and the wavelength of the optical signal to be constant by changing the wavelength of the pump from the zero dispersion wavelength toward the anomalous dispersion region of said optical fiber for wavelength conversion, intensity of idler generated by the DFWM is measured while changing the wavelength of the pump from the zero dispersion wavelength toward the anomalous dispersion region, and a wavelength obtained at the maximum idler power is used as the wavelength of the pump for fiberoptic broadband wavelength conversion.

18. A fiberoptic broadband wavelength converter according to claim 17, wherein a length of the said optical fiber for wavelength conversion as medium for the DFWM is shorter than 200 m.

19. A fiberoptic broadband wavelength converter according to claim 17, when the wavelength of the pump is set in the anomalous dispersion region of the said optical fiber for wavelength conversion and the pump power is, set to be greater than the threshold of MI, wavelength conversion which can be flattened within a wide bandwidth is permitted by the degenerated four wave mixing (DFWM).

20. A fiberoptic broadband wavelength converter according to claim 1, wherein a length of the said optical fiber for wavelength conversion as medium for the DFWM is shorter than 200 m.

21. A fiberoptic broadband wavelength converter according to claim 20, when the wavelength of the pump is set in the anomalous dispersion region of the said optical fiber for wavelength conversion and the pump power is, set to be greater than the threshold of MI, wavelength conversion which can be flattened within a wide bandwidth is permitted by the degenerated four wave mixing (DFWM).

22. A fiberoptic broadband wavelength converter according to claim 1, when the wavelength of the pump is set in the anomalous dispersion region of the said optical fiber for wavelength conversion and the pump power is, set to be greater than the threshold of MI, wavelength conversion which can be flattened within a wide bandwidth is permitted by the degenerated four wave mixing (DFWM).

* * * * *